United States Patent
Feit et al.

(10) Patent No.: US 10,289,260 B2
(45) Date of Patent: May 14, 2019

(54) SYSTEMS AND TECHNIQUES FOR APPLICATION MULTI-TASKING

(71) Applicant: Honda Motor Co., Ltd., Tokyo (JP)

(72) Inventors: Steven Feit, Dublin, OH (US); Ross Miller, Hilliard, OH (US); Michael Smith, Seattle, WA (US); Matt Conway, Seattle, WA (US); Sophie Milton, Mukilteo, WA (US); Churu Yun, Seattle, WA (US); Ric Ewing, Seattle, WA (US)

(73) Assignee: Honda Motor Co., Ltd., Tokyo (JP)

( * ) Notice: Subject to any disclaimer, the term of this patent is extended or adjusted under 35 U.S.C. 154(b) by 255 days.

(21) Appl. No.: 14/687,340

(22) Filed: Apr. 15, 2015

(65) Prior Publication Data
US 2016/0062635 A1 Mar. 3, 2016

Related U.S. Application Data

(60) Provisional application No. 62/042,595, filed on Aug. 27, 2014.

(51) Int. Cl.
*G06F 3/0484* (2013.01)
*G06F 3/0481* (2013.01)
(Continued)

(52) U.S. Cl.
CPC .......... *G06F 3/0481* (2013.01); *G06F 3/1454* (2013.01); *G06F 9/485* (2013.01); *G05B 2219/25347* (2013.01)

(58) Field of Classification Search
CPC ..... G06F 3/0488; G06F 3/0481; G06F 3/0484
See application file for complete search history.

(56) References Cited

U.S. PATENT DOCUMENTS 5,757,268 A 5/1998 Toffolo et al.
5,874,962 A * 2/1999 de Judicibus ......... G06F 3/0481
715/789
(Continued)

FOREIGN PATENT DOCUMENTS

EP 2937771 10/2015
GB 2446468 8/2008
(Continued)

OTHER PUBLICATIONS

Apple.com, "Apple CarPlay—The best iPhone experience on four wheels," as captured on Apr. 7, 2015 via web.archive.org, pp. 1-10. (Year: 2015).*

(Continued)

*Primary Examiner* — Dino Kujundzic
(74) *Attorney, Agent, or Firm* — Rankin, Hill & Clark LLP

(57) ABSTRACT

One or more embodiments of techniques or systems for application management are provided herein. For example, a system for application management may launch or execute multiple applications, such as a first application and a second application. The system for application management may provide a user with different ways of multi-tasking or ways to switch between applications, such as providing or generating home screen shortcuts for a most recently utilized application or a most frequently launched application. Additionally, the system for application management may enable multi-tasking or swapping of applications when a user double taps a home button, initiates a swipe gesture, hits a task swap button, speaks a voice command, etc. In this manner, application management is provided such that a user may engage in the use of multiple applications or switching between in a quick or efficient manner.

18 Claims, 10 Drawing Sheets

(51) Int. Cl.
*G06F 3/14* (2006.01)
*G06F 9/48* (2006.01)

(56) References Cited

U.S. PATENT DOCUMENTS

| | | | |
|---|---|---|---|
| 6,232,957 B1 | 5/2001 | Hinckley | |
| 6,819,990 B2 | 11/2004 | Ichinose | |
| 7,088,343 B2 | 8/2006 | Smith et al. | |
| 7,126,581 B2 | 10/2006 | Burk et al. | |
| 7,543,244 B2 | 6/2009 | Matthews et al. | |
| 7,595,810 B2* | 9/2009 | Louch | G06F 9/4443 345/629 |
| 8,078,359 B2 | 12/2011 | Small et al. | |
| 8,115,749 B1 | 2/2012 | Simpson | |
| 8,188,969 B2 | 5/2012 | Morin et al. | |
| 8,406,961 B2 | 3/2013 | Pathak et al. | |
| 8,451,219 B2 | 5/2013 | Morin et al. | |
| 8,504,936 B2 | 8/2013 | Gimpl et al. | |
| 8,606,519 B2 | 12/2013 | Waeller | |
| 8,677,284 B2 | 3/2014 | Aguilar | |
| 8,711,115 B2 | 4/2014 | Ozawa et al. | |
| 8,832,559 B2 | 9/2014 | Mentchoukov et al. | |
| 8,860,676 B2 | 10/2014 | Higashi et al. | |
| 8,892,299 B2 | 11/2014 | Small et al. | |
| 8,907,778 B2 | 12/2014 | Waeller et al. | |
| 9,024,975 B2 | 5/2015 | Dubs et al. | |
| 9,032,292 B2 | 5/2015 | Lavallee | |
| 9,052,925 B2 | 6/2015 | Chaudhri | |
| 9,058,186 B2 | 6/2015 | Chaudhri | |
| 9,116,594 B2 | 8/2015 | Hwang et al. | |
| 9,285,944 B1* | 3/2016 | Penilla | G06F 3/04842 |
| 2002/0060668 A1 | 5/2002 | McDermid | |
| 2003/0043123 A1 | 3/2003 | Hinckley et al. | |
| 2004/0150657 A1* | 8/2004 | Wittenburg | G06F 3/04815 345/619 |
| 2004/0239622 A1 | 12/2004 | Proctor et al. | |
| 2005/0149879 A1* | 7/2005 | Jobs | G06F 3/0481 715/796 |
| 2005/0169503 A1* | 8/2005 | Howell | G06F 3/011 382/115 |
| 2006/0213754 A1* | 9/2006 | Jarrett | G06F 3/0481 200/43.01 |
| 2007/0057922 A1 | 3/2007 | Schultz et al. | |
| 2007/0136681 A1 | 6/2007 | Miller | |
| 2007/0177803 A1* | 8/2007 | Elias | G06F 3/04883 382/188 |
| 2007/0185631 A1 | 8/2007 | Yeh et al. | |
| 2007/0220441 A1* | 9/2007 | Melton | G06F 17/30876 715/781 |
| 2007/0256027 A1* | 11/2007 | Daude | B60K 35/00 715/810 |
| 2008/0012831 A1 | 1/2008 | Bauman et al. | |
| 2008/0168379 A1* | 7/2008 | Forstall | G06F 3/04883 715/778 |
| 2008/0258995 A1 | 10/2008 | Vissenberg et al. | |
| 2008/0313567 A1* | 12/2008 | Sabin | G06F 3/0481 715/835 |
| 2010/0088634 A1 | 4/2010 | Tsuruta et al. | |
| 2010/0188343 A1 | 7/2010 | Bach | |
| 2011/0043468 A1 | 2/2011 | Lathrop et al. | |
| 2011/0055741 A1 | 3/2011 | Jeon et al. | |
| 2011/0169750 A1 | 7/2011 | Pivonka et al. | |
| 2011/0175930 A1 | 7/2011 | Hwang et al. | |
| 2012/0007823 A1 | 1/2012 | Ozawa et al. | |
| 2012/0115453 A1* | 5/2012 | Zheng | H04M 1/72569 455/418 |
| 2012/0139858 A1 | 6/2012 | Simpson | |
| 2012/0159380 A1* | 6/2012 | Kocienda | G06F 3/04883 715/783 |
| 2012/0204131 A1 | 8/2012 | Hoang et al. | |
| 2012/0254807 A1 | 10/2012 | Evans et al. | |
| 2012/0317503 A1* | 12/2012 | Noh | G06F 3/04883 715/760 |
| 2013/0014040 A1 | 1/2013 | Jagannathan et al. | |
| 2013/0047105 A1 | 2/2013 | Jarrett et al. | |
| 2013/0113726 A1 | 5/2013 | Tovar et al. | |
| 2013/0120295 A1 | 5/2013 | Kim et al. | |
| 2013/0132874 A1 | 5/2013 | He et al. | |
| 2013/0140965 A1 | 6/2013 | Franklin et al. | |
| 2013/0159900 A1 | 6/2013 | Pendharkar | |
| 2013/0181941 A1* | 7/2013 | Okuno | G06F 3/041 345/174 |
| 2013/0227419 A1* | 8/2013 | Lee | G06F 9/48 715/728 |
| 2013/0283212 A1 | 10/2013 | Zhu et al. | |
| 2013/0311883 A1* | 11/2013 | McCoy | G06F 11/3438 715/703 |
| 2013/0311946 A1* | 11/2013 | Kwon | G06F 3/04817 715/811 |
| 2013/0317997 A1 | 11/2013 | Sjoblom | |
| 2014/0026098 A1* | 1/2014 | Gilman | G06F 3/0482 715/810 |
| 2014/0049476 A1 | 2/2014 | Bragin | |
| 2014/0062872 A1 | 3/2014 | Tanaka | |
| 2014/0068518 A1 | 3/2014 | Liu et al. | |
| 2014/0123022 A1* | 5/2014 | Lee | H04M 1/72566 715/747 |
| 2014/0157163 A1 | 6/2014 | Strutin-belinoff et al. | |
| 2014/0229888 A1 | 8/2014 | Ko et al. | |
| 2014/0309870 A1* | 10/2014 | Ricci | H04W 4/21 701/36 |
| 2014/0359456 A1* | 12/2014 | Thiele | H04W 4/027 715/735 |
| 2015/0022475 A1 | 1/2015 | Watanabe et al. | |
| 2015/0135108 A1* | 5/2015 | Pope | G06K 9/00006 715/767 |
| 2015/0224876 A1 | 8/2015 | Tsunoda et al. | |
| 2015/0234556 A1 | 8/2015 | Zhu et al. | |
| 2015/0286393 A1 | 10/2015 | Wild et al. | |
| 2015/0365306 A1 | 12/2015 | Chaudhri et al. | |
| 2016/0062635 A1 | 3/2016 | Feit et al. | |
| 2016/0085438 A1 | 3/2016 | Doan et al. | |

FOREIGN PATENT DOCUMENTS

JP 2013105425 5/2013
JP 5617783 11/2014

OTHER PUBLICATIONS

Search Report of German Application Serial No. 10 2017 219 332.8 dated May 17, 2018, 8 pages.
Office Action of U.S. Appl. No. 15/669,992 dated Nov. 16, 2018, 32 pages.

* cited by examiner

SYSTEMS AND TECHNIQUES FOR APPLICATION MULTI-TASKING

CROSS-REFERENCE TO RELATED APPLICATIONS

This application claims the benefit of U.S. Provisional Patent application Ser. No. 62/042,595 entitled Application Management and filed on Aug. 27, 2014, the entirety of which is incorporated by reference herein.

BACKGROUND

Generally, vehicles may be equipped with touch screens and systems which run applications. Applications may include gaming applications, navigation applications, weather applications, etc. Often, vehicles may have heads up displays (HUDs) or other displays in addition to a center console display to facilitate use of applications, media consumption, or to provide information for a driver of a vehicle at the glance of an eye. Because the primary focus of a driver of a vehicle should be on the road, multi-tasking between multiple applications, such as a first application and a second application, and driving may prove difficult for some individuals or drivers.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One or more embodiments of techniques or systems for application management are provided herein. Generally, vehicles may be equipped with systems which are capable of launching, executing, or running applications or 'apps'. Because technology has advanced, often it is possible to multi-task or run multiple applications concurrently. In other words it may be possible to have a first application running in the foreground and a second application running in the background. In one or more embodiments, a system or method for application management enables a user to quickly switch or multi-task between two or more applications in an efficient manner. A system for application management may provide a user with many different ways of switching between applications. For example, a user may launch a first application, return to a home screen while the first application is running in the background, and utilize a most recent application shortcut provided by the system to launch a second application or to swap back to applications open in the background.

In one or more embodiments, a user may switch or cycle between applications by double tapping a home button or double tapping a touch screen. The system may, in yet another embodiment, provide the user with a task swap button or a button associated with a command to cycle or swap between two or more applications. A customization component may enable a user to setup custom settings or user actions or otherwise create a user defined input to multi-task or swap between applications. Examples of user inputs which may be indicative of a command to switch between applications may include gestures, voice commands, a swipe from a taskbar, or a two finger swipe, etc.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
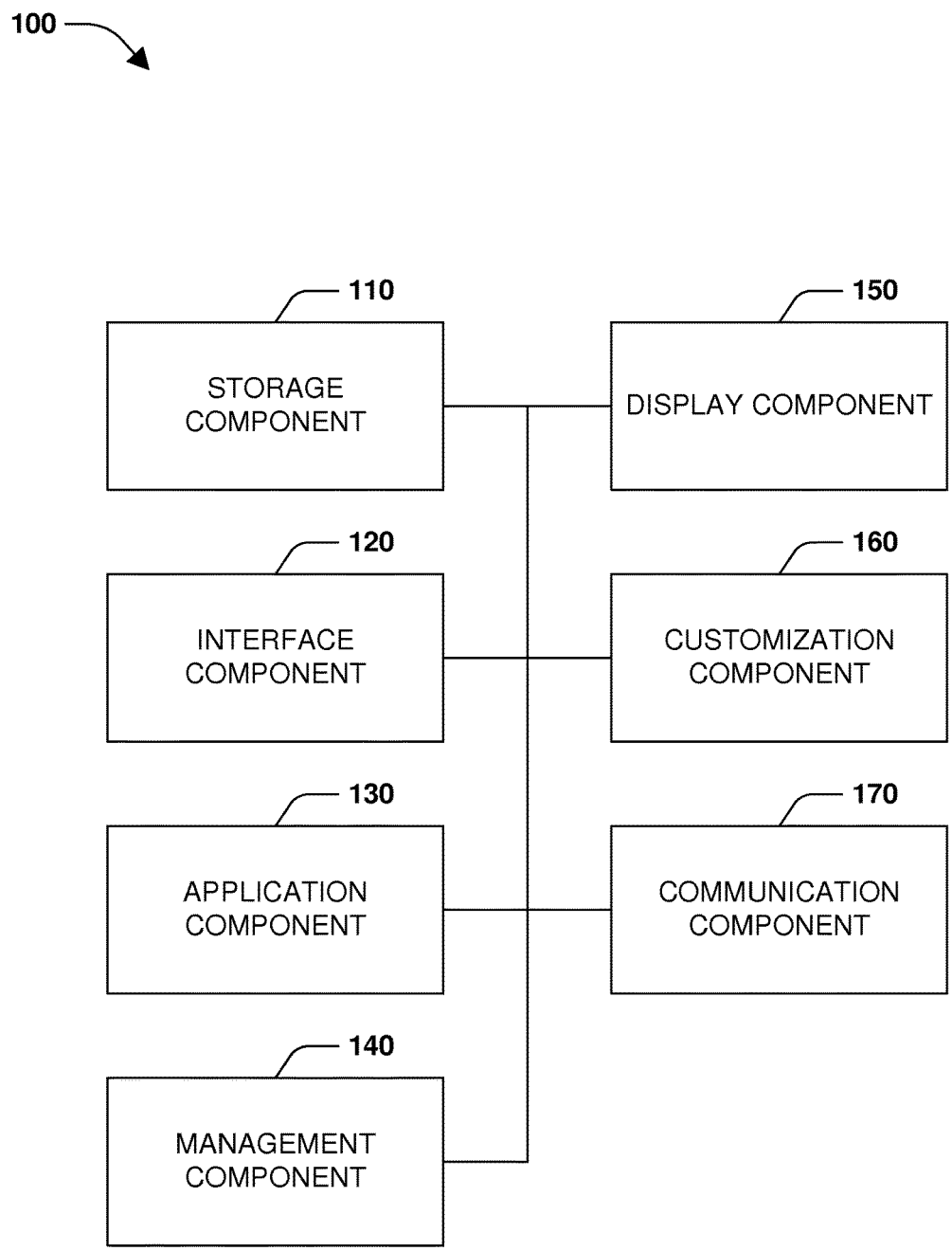
FIG. 1 is an illustration of an example component diagram of a system for application management, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 10:
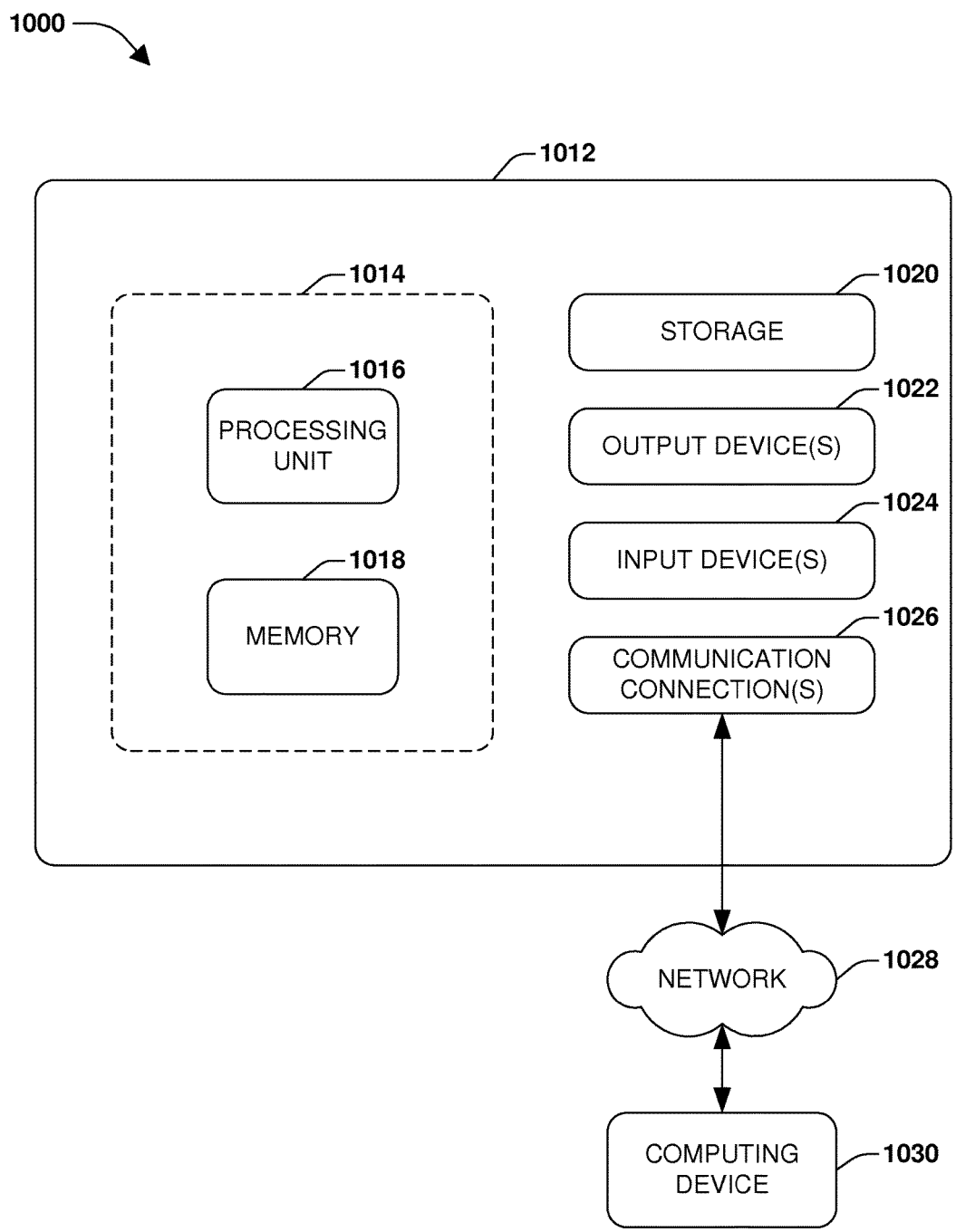
FIG. 10 is an illustration of an example computing environment where one or more of the provisions set forth herein are implemented, according to one or more embodiments.

For one or more of the figures herein, one or more boundaries or lines, such as boundary 1014 of FIG. 10, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The following terms are used throughout the disclosure, the definitions of which are provided herein to assist in understanding one or more aspects of the disclosure.

As used herein, a user may include a driver of a vehicle, an occupant of a vehicle, an individual, a passenger, or other entity.

As used herein, a content item or application may include a tile, an icon, an 'app', media, an audio clip, or shortcuts associated therewith.

As used herein, multi-tasking may include toggling between applications, scrolling through different applications, cycling through two or more different applications, swapping or switching between applications (e.g. or corresponding views), minimizing or maximizing applications, changing a size of an application, moving an application from a screen to a taskbar, etc. Further, an application in the 'foreground' may be an active application or visible to a user, while an application in the 'background' may be an inactive application or less visible to a user than an active application.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an example component diagram of a system 100 for application management, according to one or more embodiments. The system 100 may include a storage component 110, an interface component 120, an application component, a management component 140, a display component 150, a customization component 160, and a communication component 170.

The storage component 110 may store content items, such as tiles, icons, applications, apps, media, audio clips, shortcuts associated therewith, layouts for home screens, etc. In one or more embodiments, one or more of the content items or applications may be stored remotely, such as on a server or on another device, and may be streamed or communicated to the system 100 for application management. In other words, the storage component 110 may enable applications or other content items to be stored locally on a system 100. However, one or more embodiments provide that one or more of the applications or content items may be stored remotely such that the storage component 110 may not be utilized to run or execute one or more of those applications, for example.

The interface component 120 may enable a user, a driver, or occupant to interact with or provide input, such as user input, gestures, clicks, points, selections, etc., to the system 100 for application management. As an example, the interface component 120 may include a touch screen, a touchpad, a trackpad, one or more hardware buttons, one or more software buttons, one or more soft buttons, one or more switches, a keypad, a microphone, one or more sensors, or other human-machine interface (HMI), etc. The interface component 120 may be integrated or be a part of the display component 150, such as a touch screen, which would include a display component 150 capable of receiving touch input or gesture inputs and also be capable of rendering content, such as icons, shortcuts, a home screen, an interface, etc. In other words, a touchscreen component may include or integrate the interface component 120, the display component 150, or one or more other components.

In one or more embodiments, the interface component 120 may include a home button. When the interface component 120 receives an input or user input associated with a press or activation of the home button, corresponding functionality may be enabled, initiated, or executed by the interface component 120, such as by displaying a home screen view, a first view associated with a first application, or a second view associated with a second application, for example. In one or more embodiments, consecutive presses of the home button (e.g., a double tap, triple tap, etc.) may be configured to facilitate multi-tasking, such as by switching between a first application and a second application (e.g., if a second application is open or running) or by switching between views of the first application and the second application. The home button may be a hardware button, a soft button, or a software button. In other words, the interface component 120 may comprise a home button in one or more embodiments. In other embodiments, the interface component 120 may generate the home button (e.g., as a 'soft' button or software button to be rendered on the display component 150), for example.

Regardless, the interface component 120 may receive one or more user inputs, such as from a user, driver, or other occupant of a vehicle. As an example, a first user input may be a command to launch a first application and a second user input may be a command to launch a second application. The interface component 120 may receive a variety of types of user inputs, such as verbal commands, spoken commands (e.g., utilizing a microphone or audio sensor), pressing of buttons, activating switches, gesture inputs, such as a swipe, a two finger swipe, a pinch and zoom, a touch (e.g., utilizing a touch screen), a press, a press and hold, a selection, a movement of a cursor, a click (e.g., utilizing a button, mouse button, track button), etc.

The application component 130 may launch, execute, or run one or more content items, such as applications or apps. For example, when a user provides the interface component 120 with a user input, such as a gesture, a point, a click, or other user input indicative of a command for an application to be launched (e.g., a selection gesture associated with an icon or shortcut corresponding to an application), the application component 130 may launch or execute that corresponding application. In other words, the application component 130 may launch or execute an application, such as a first application, in response or based on a user input indicative of a command to launch the first application. In this way, the application component 130 may facilitate operation of applications selected by a user, occupant, or driver of a vehicle.

In one or more embodiments, the application component 130 may execute or run an operating system which may enable users to select one or more applications from one or more home screens, such as a first home screen, a second home screen, a third home screen, etc. For example, the application component 130 may execute or run an operating system with a tile layout or a grid layout with one or more shortcuts or one or more links to one or more applications or content items. Generally, the system 100 may present a view of the operating system as a page from one or more of the pages of home screens. Similarly, the system 100 may present views of applications when respective applications are executed or launched (e.g., based on user input). When a home button, such as a home button generated by an interface component 120, is activated or pressed, the application component 130 may manage a view or update a view to be rendered (e.g., by the display component 150) to include a first page of a home screen. In other words, when the home button is pressed (e.g., a single press), the application component 130 may cause the first page of the home screen to be rendered as a result, for example. In this way, the application component 130 may manage one or more aspects related to the operating system. Here, the management component may determine a home screen view based on a user input indicative of a command to go to a home screen, such as a single tap of a home button.

Additionally, as will be described herein, subsequent presses of the home button may result in other functionality. For example, when a double tap of the home button is received by the interface component 120 and multiple applications are running, the management component 140 may cycle through one or more of the applications, thereby enabling a user to multi-task in a quick or efficient manner. As another example, if a user subsequently presses the home button, such as after a threshold tap time has passed, the application component 130 may update a view to be rendered to include subsequent pages of the home screen, such as a second page of a home screen for a second press of a home button, a third page of a home screen for a third press of a home button, etc. In other words, the application component 130 may scroll to a previous or following home screen (e.g., when multiple home screens exist) in response to a press of a home button. In this way, the application component 130 may move or shift a view from a second page of a home screen or a second home screen to a third page of a home screen or a third home screen based on a user input which is a press of a home button, for example. Explained yet another way, subsequent presses of a home button which are not double taps (e.g., a subsequent or second press of a home button within a threshold tap time), when received, may cause the application component 130 to adjust a current view or updated view to include subsequent pages of a home screen (e.g., from a first page of a home screen to a second page of a home screen, from the second page of the home screen to a third page of the home screen, and from the third page of the home screen back to the first page of the home screen).

In one or more embodiments, the application component 130 may track or store one or more usage characteristics or one or more usage statistics associated with use or use conditions for one or more of the applications. Examples of usage characteristics or usage statistics may include a most frequently launched application, second most frequently launched application, etc., frequency of access for one or more applications, launch counts for one or more applications, time spent interacting with one or more applications, one or more timestamps indicative of when an application was last launched, a launch order for one or more of the applications, an order of access for one or more of the applications, a previously launched or accessed application, a most recently launched application, a second most recently launched application, time of launch, whether a vehicle is in drive or park, whether a passenger is present when an application is launched, etc. The application component 130 may designate one or more applications as a background application, a current application, an active application, etc. based on a launch order, order of access, etc.

The application component 130 may thus track usage of one or more content items or one or more applications and facilitate management of one or more applications in a user friendly manner. In other words, the application component 130 may present one or more icons or one or more shortcuts to one or more applications to a user based on a context (e.g., driving, passenger present, day of week, habits), which may be determined based on one or more of the usage characteristics. Explained yet another way, the application component 130 may track one or more habits associated with one or more users with regard to application consumption or usage.

The application component 130 may promote use of applications in a user friendly or easy to use manner in a variety of ways. For example, the application component 130 may generate one or more shortcut icons on one or more pages of a home screen, such as on a first page of a home screen or a first home screen. Here, in this example, the application component 130 may generate a shortcut to a most recently used or most recently launched application in an upper left hand corer of a grid of a home screen. The application component 130 may provide shortcuts to most recently used applications, most frequently used or accessed applications, applications associated with navigation, applications associated with a level of user interaction, etc.

In one or more embodiments, the application component 130 may create, generate, or place a shortcut associated with a most recently utilized application, most frequently utilized, or an application based on one or more of the usage characteristics on a page of a home screen, such as a first page of a home screen. As an example, if a user utilizes the interface component 120 to launch a first application, the application component 130 may launch the first application and track usage or usage characteristics associated with the first application (e.g., number of launches, time spent in application, etc.) or otherwise designate the first application as a recently utilized application. As a result of tracking the usage characteristics, the application component 130 may create or generate a shortcut to the first application (e.g., representing a most utilized application, most recently launched application, or other usage characteristic based selection of an application). In other words, the application component 130 may generate one or more shortcuts to one or more of the applications based on one or more usage characteristics. Here, the application component 130 may place the most recently launched application in an upper left hand corner of a grid on a page of a home screen, such as on a first page of the home screen or on a first home screen, thereby enhancing accessibility to a corresponding application.

In one or more embodiments, the application component 130 may create or generate new shortcuts (e.g., such as when a shortcut to a most recently utilized application doesn't exist) for a most recently utilized application or other application selected or determined based on one or more of the usage characteristics (e.g., a generated shortcut). Additionally, the application component 130 may rearrange, shift, prioritize, or reorganize one or more shortcuts to one or more applications on one or more home screens or pages of home screens. For example, when a previously launched application (e.g., recently launched application) is found or determined, the application component 130 may shift one or more content items, one or more applications, or one or more shortcuts to one or more of the applications to accommodate a position of a shortcut associated with a recently launched application. In other words, the application component 130 may designate a new shortcut position or default position for a usage characteristic based application to displace one or more existing shortcuts on a home page, for example.

According to one or more aspects, the application component 130 may promote existing shortcuts to a shortcut location, such as if an existing shortcut is associated with a most recently launched application, for example. The shortcut location may be a location or position on the home screen designated for quicker access to applications. The application component 130 may create, generate, or promote a shortcut based on a location of another shortcut for a corresponding application. In other words, the application component 130 may determine that promoting a shortcut makes more sense when a shortcut for the corresponding application already exists on a home page (e.g., rather than creating a second copy of a shortcut which already exists on a home screen), thereby mitigating having two copies of the same application on a home page at different locations, for example. In this way, the application component 130 may arrange, create, shift, or manage one or more content items, applications, shortcuts, or application shortcuts based on locations of one or more existing shortcuts or application shortcuts.

The application component 130 may determine one or more shortcut locations for one or more shortcuts. For example, if the system 100 for application management is in an initial state, previously launched applications are cleared, or no previously launched or recently launched applications are found or otherwise determined, the application component 130 may organize one or more of the content items, applications, or shortcuts according to a default order, such as alphabetical, favorites first, a chronological order, reverse chronological order, order of installation, etc. The application component 130 may generate one or more shortcuts to one or more applications for one or more home screens or for a corresponding home screen view.

As another example, the application component 130 may determine a shortcut location for a generated shortcut or a promoted shortcut to be in the upper left most position of a grid on a first page of a home screen or first home page, which is generally closest to a driver of a vehicle. In other embodiments, the application component 130 may determine shortcut locations to be in other positions or positions other than the upper left most corner of a grid. Additionally, the application component 130 may provide, create, generate, or promote multiple shortcuts, such as a first shortcut for a most recently launched application and a second shortcut for a second most recently launched application, etc. In this way, multiple positions or multiple shortcuts may be provided to facilitate application management.

As discussed, one or more usage characteristics tracked or monitored by the application component 130 may include aspects related to when or how an application is used, such as which occupant of a vehicle launched an application, when an application was launched, time of day or day of week launched, whether a vehicle is in park or drive, a gear of the vehicle, etc. In this way, usage characteristics may be utilized by the application component 130 to provide recent applications or frequently launched application to users or occupants of a vehicle according to a context or in accordance with a current scenario.

For example, if a user or driver is driving, the application component 130 may determine that a most frequently utilized application while the vehicle is in drive is a navigation application. However, when the vehicle is in park, the application component 130 may determine that a different application, such as a game, may be the most frequently launched application in the parking context. To this end, the application component 130 may have the display component 150 render a first shortcut (e.g., a game application) at a shortcut location on a home screen when the vehicle is in park and a second shortcut (e.g., a navigation application shortcut) at the same shortcut location on the home screen when the vehicle is in drive. Accordingly, the application component 130 may select, determine, promote, or generate shortcuts based on one or more usage characteristics, such as operation mode or gear of a vehicle, for example. By tracking context or usage of one or more of the applications, the application component 130 may provide users or drivers of vehicles with shortcuts to applications which may be more useful to occupants of vehicles due to presentation of respective shortcuts based on the context of a scenario.

As another example, applications associated with passenger usage (e.g., which may be a usage characteristic) may be tracked to determine usage when a passenger or other occupant is present (e.g., versus when merely a driver is present in the vehicle). Accordingly, the application component 130 may provide shortcuts based on one or more usage characteristics (e.g., context) for one or more of the applications, such as presence of passengers or what gear a vehicle is in.

In one or more embodiments, the application component 130 may generate one or more shortcuts, such as at a home screen location, where respective shortcuts may be indicative of one or more applications which are currently running in the background or behind the scenes. In other words, if a first application and a second application are running in the background, such as a music application and a navigation application, respectively, the application component 130 may create or generate two shortcuts or icons—one for the first application running in the background (e.g., the music application) and one for the second application running in the background (e.g., the navigation application). Effectively, the application component 130 may act as a 'task manager' by providing icons or shortcuts to applications which are currently running and generating these shortcuts on a page of a home screen such that a user may interact with respective shortcuts in a quick and efficient manner. Here, a user may hit the home button and quickly return to the application that he or she was using by clicking or selecting the shortcut created for the corresponding application, which may be placed in the upper left hand corner of a home screen grid, for example.

In one or more embodiments, the management component 140 may enable multi-tasking or switching between two or more applications, such as a first application and a second application or a first view associated with the first application and a second view associated with the second application. For example, the first application may be running in the background while the second application is running in the foreground (e.g., a current application or main application). In other embodiments, applications may be running concurrently or simultaneously, where one of the applications occupies a greater screen area than the other application, for example. One of the applications (e.g., the first application or the second application) may be a most recently used application, a previous application, or a previously launched application. For example, a user may launch or execute the first application, press the home button to view other applications (e.g., which may cause the first application to run in the background), and launch the second application (e.g., which makes the first application the previously launched application or most recently used application, chronologically).

In one or more embodiments, the management component 140 may enable cycling through one or more open, running, or current applications via a variety of user inputs, such as based on the double tapping a home button, for example. Here, a user may be able to achieve multi-tasking or switch between a first application and a second application by double tapping or double clicking a home button (e.g., the double tap of the home button may be received as a user input by the interface component 120). In this way, the application component 130 may toggle, switch, or cycle between two or more applications, thereby enabling a user to effectively multi-task. Here, the management component 140 may determine an updated view from a first view associated with the first application or a second view associated with the second application. The management component 140 may initiate determination of an updated view when a user input is received, such as a user input indicative of a command to switch between a first application and a second application or a current application and a background application. As an example, the user input may be a double tap of a home button.

In one or more embodiments, the management component 140 may create or place a task swap button or other button (e.g., hardware button, soft button, or software button) which, when pressed will enable a user to quickly switch between applications in a similar manner as described above, thereby enabling users to have multiple ways of multi-tasking, for example. In yet another example, a steering wheel of a vehicle may be equipped with a button or a set of buttons designated for multi-tasking or switching between two or more applications. As an example, if three applications, such as a first application (e.g., launched first), a second application, and a third application (e.g., launched after the second application) are running, the set of buttons on the steering wheel may be utilized to scroll through respective applications based on an order the applications were launched, for example. Here, the set of buttons may scroll through or switch focus or designate a primary application in a first application, second application, third application order or manner. In other words, when the set of buttons are pressed, the management component 140 may cycle from the first application to the second application, from the second application to the third application, and from the third application to the first application (or in reverse order when a button corresponding to an opposite direction is pressed). In this way, the system 100 for application management may provide a user with multiple ways of multi-tasking, switching between applications, or accessing a most recently utilized or launched application. Accordingly, a user, occupant, or driver of a vehicle may quickly switch between two or more applications, thereby enabling the user to multi-task in an efficient manner. Other buttons or controls may be utilized to multi-task or switch between applications, such as a volume control knob, for example.

As another example, a user may provide user inputs to the interface component 120, such as a two finger swipe, or other type of gesture to switch between a first application and a second application. In other words, a swipe input or a swipe gesture may be one example of a way a user may interact with a system 100 for application management to switch between a background application and a main application, between a current application and a most recently used application, or between a first application and a second application which are running. For example, a two finger swipe to the right may bring up or switch to a previous application while a two finger swipe to the left may cycle to or switch to a next application. Although described with swipes or two finger swipes, it will be appreciated that other types of inputs or user inputs not necessarily limited to gesture inputs are contemplated, such as keystrokes, voice commands, etc.

In one or more embodiments, the management component 140 may launch an application when a switch between applications command is received. For example, if a double tap on a home button is setup to switch between a first application and a second application, the management component 140 may launch a second application if no first application or second application is running and the home button is double tapped. Further, selection or determination of the second application may be based on usage statistics or usage characteristics, such as most used by time, most launched by frequency, an inferred importance by typical launch order, etc. In other words, if a command to switch between applications is given and merely a single application is running, the management component 140 may automatically launch a second application. This second application may be the most recently (or second most recently) utilized application or most frequently utilized application. In other words, a swap or switch between applications command does not require an application to be running in the background. For example, the swap command may launch, open, or switch to a most recently utilized application (e.g., regardless of whether the most recently utilized application is active or inactive). Explained another way, when a toggle application command is received and no second application is running, the management component 140 may determine a second application to launch based on one or more application usage statistics or one or more usage characteristics.

The management component 140 may compare the second application against the first application to ensure that multiple instances of the same application are not initiated. For example, if a first application is launched (e.g., and no second application is active or running), a switch application command is received, the management component 140 may selected a most utilized or most frequently launched application to launch as a second application. However, if the most frequently launched application is the first application, the management component 140 may select a second most frequently launched application such that two instances of the first application are not running or launched concurrently.

Additionally, user inputs may be mapped in a customizable fashion for multi-tasking. For example, a user may manage one or more settings utilizing a customization component 160 to enable a two finger swipe to move a current application to become a background application. This may cause a home screen to come up or a second application (e.g., which was a background application) to become active or become the current application. In other embodiments, a swipe or other user input may be mapped to move an application to a task list or to a smaller screen area, such as to a notification bar or a smaller window, for example.

The display component 150 may render one or more content items, such as icons, applications, apps, shortcuts, one or more home screens, one or more pages of home screens, applications launched therefrom, one or more grids of shortcuts, content, media, etc. In other words, the display component 150 may render one or more applications, such as a first view associated with a first application or a second view associated with a second application. Further, the display component 150 may render an operating system on which one or more of the application is running and one or more home screen or pages of home screens with one or more icons or shortcuts for one or more of the applications. The display component 150 may render icons or shortcuts on a home screen based on one or more usage characteristics (e.g., presence of passengers, etc.), such as shortcuts to applications frequently utilized when passengers are present. Further, the display component 150 may render one or more views based on views, current views, or updated views determined by the management component 140, for example.

The customization component 160 may enable a user, driver, or occupant of a vehicle to manage applications in a customizable manner. For example, the customization component 160 may assign a customized or user defined input to a function, such as switching between a first application and a second application, scrolling through active or running applications, or switching to a most recently launched application or most recently utilized application. In this way, a user may select his or her own inputs for cycling between applications. Explained another way, a user may utilize the customization component 160 to setup relationships between user inputs and commands for one or more applications as he or she sees fit, thereby allowing the user to make a two finger swipe (e.g., or most any other user input) a command to swap applications, for example.

The customization component 160 may enable a user, driver, occupant, etc. to select a custom position for a shortcut or accessibility shortcut. For example, if an occupant or passenger of a vehicle is generally the user utilizing an application while the driver is operating the vehicle, the customization component 160 may allow the passenger or a user to setup shortcuts to appear right to left (e.g., upper right hand corner of a grid), rather than left to right (e.g., because the passenger may be sitting on the right side of the vehicle). Additionally, the customization component 160 may allow users to enable or disable automatic creation or promotion of icons or shortcuts, multi-tasking, automatic launching of applications, etc., such as a by setting a one or more corresponding user preferences or a user profile. For example, user preferences may include an automatic launch preference indicative of whether or not to automatically launch a most utilized application when a switch application command is received and no second application is running.

In one or more embodiments, the communication component 170 may receive one or more usage characteristics. For example, a controller area network (CAN) of a vehicle may deliver one or more of the usage characteristics to the communication component. Here, the CAN may provide a mode of the vehicle or a current gear of the vehicle (among other things) so that the application component 130 may identify or track application usage accordingly. The communication component 170 may receive the time of day or day of the week from other sources or external sources, such as a clock of the vehicle, via a telematics channel, via a connection with a mobile device, a telematics channel, etc. Regardless, the communication component 170 may receive one or more usage characteristics (e.g., whether a vehicle is in park or drive, a velocity of the vehicle, presence information associated with a passenger, etc.) or supplemental characteristics (e.g., time of day) which may be utilized to classify or track usage of one or more applications.

Figure 2:
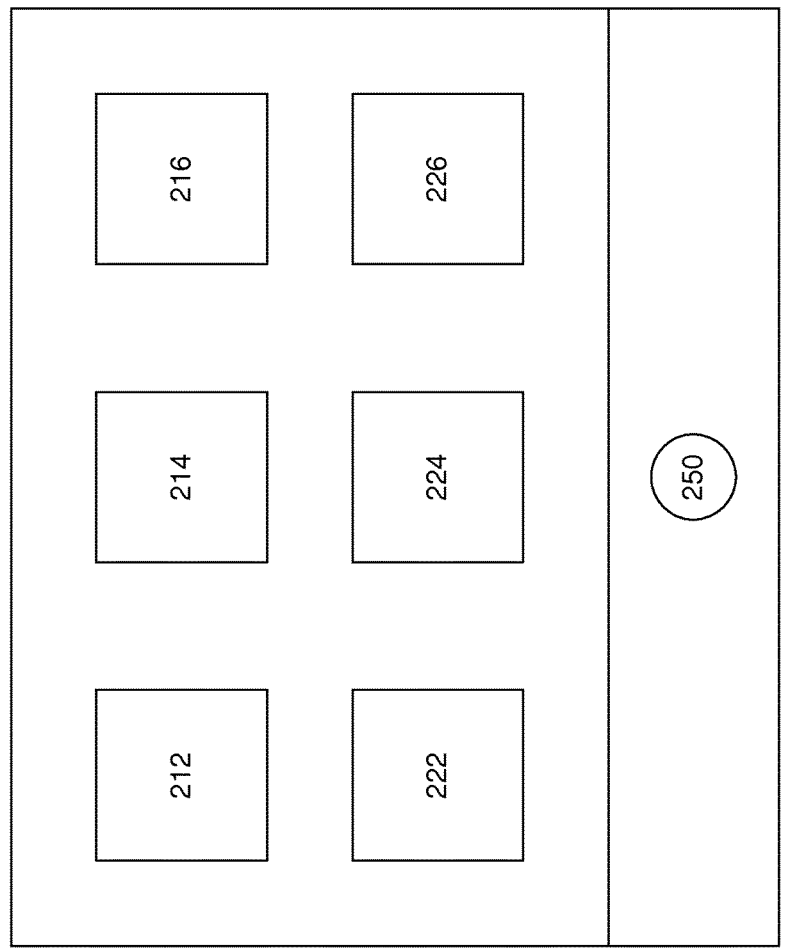
FIG. 2 is an illustration of an example implementation of a system for application management, according to one or more embodiments.

FIG. 2-FIG. 6 or other figures may be described with reference to FIG. 1 or one or more components associated therewith. To this end, FIG. 2 is an illustration of an example implementation 200 of a system for application management, according to one or more embodiments. In FIG. 2, an example implementation 200 includes a rendering of shortcuts to applications 212, 214, 216, 222, 224, and 226. Additionally, a home button 250 is shown. In one or more embodiments, a double press or double tap of the home button 250 enables a user to cycle through one or more open, current, active, or background applications. In one or more embodiments, respective shortcuts may be utilized to effectively create a task manager. For example, if a first application is open and running in the background and a second application is open and running in the background, shortcut 212 may represent the first application and shortcut 214 may represent the second application. Here, an application component, such as application component 130 may create shortcuts 212 and 214 and 'shift' shortcuts 216, 222, 224, or 226 accordingly. As an example, if no applications are running, shortcut 216 may return to the position of shortcut 212, shortcut 222 may be positioned at the position of shortcut 214, etc. Similarly, when applications corresponding to shortcuts 212 and 214 are running, other icons or shortcuts (not shown) may be 'pushed' off of the home page of the implementation 200, as seen in FIG. 2.

In one or more embodiments, if a first application and a second application are running, the application component 130 may promote the position of a shortcut. For example, if a shortcut is located at 226 and a user launches the corresponding application, the management component may move the location of that shortcut to occupy the position at 212, thereby promoting the shortcut such that merely 212 is occupied with a shortcut to that application and no duplicate shortcut exists at position 226. Alternatively, or in one or more embodiments, if a shortcut for an application exists on another home page or doesn't exist, a corresponding shortcut may be created, such as at position 212 and other existing shortcuts shifted or rearranged accordingly.

In one or more embodiments, a user may customize positioning of shortcuts based on user preferences (e.g., a user may decide to make position 216 a default location for a most recently launch application shortcut).

Figure 3:
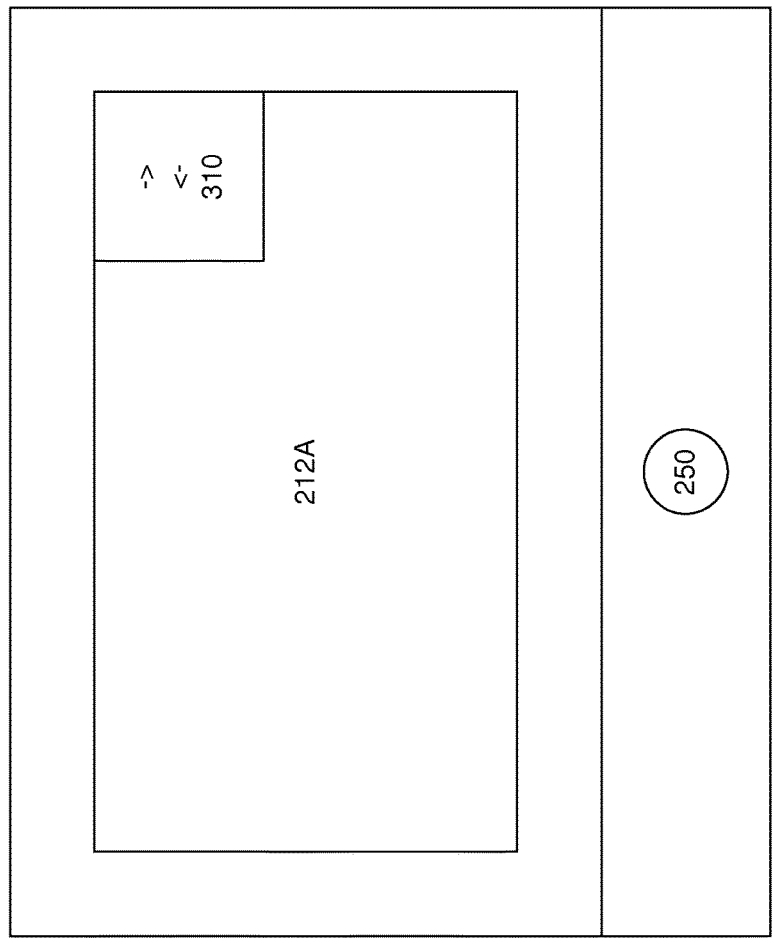
FIG. 3 is an illustration of an example implementation of a system for application management, according to one or more embodiments.

FIG. 3 is an illustration of an example implementation 300 of a system for application management, according to one or more embodiments. Here, in this example, a first application and a second application are running concurrently. Application 212A is running currently or in the foreground, while a second application (214, not shown) may be running in the background. The management component 140 may provide or generate a swap application button 310, which when pressed, enables a user to swap between the first application and the second application or application 212A and 214 (not shown).

Figure 4:
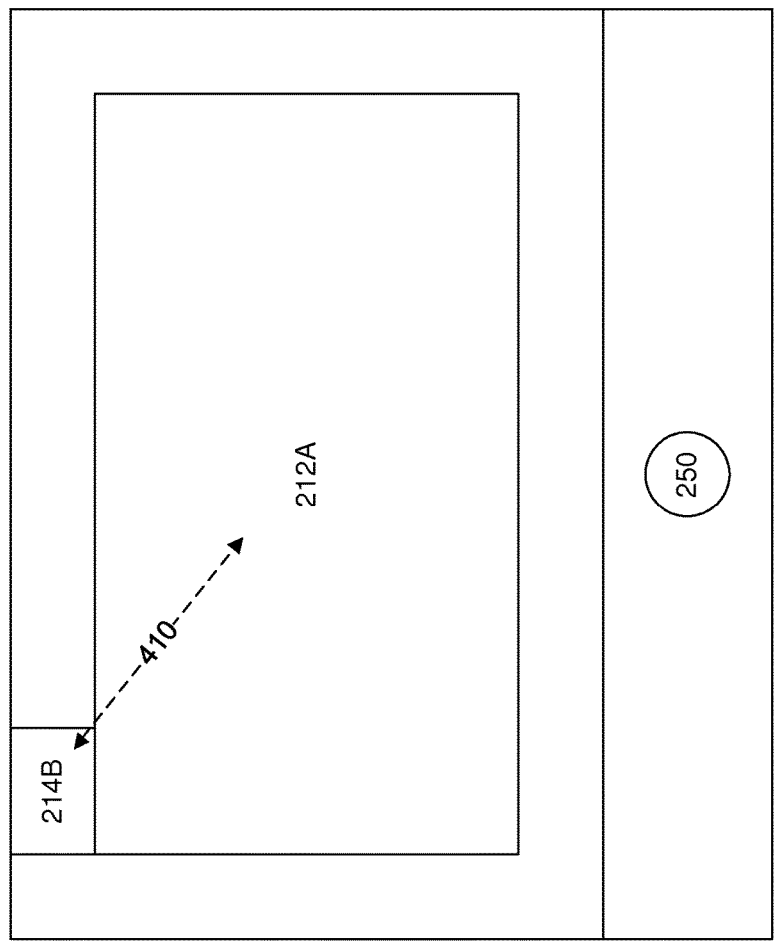
FIG. 4 is an illustration of an example implementation of a system for application management, according to one or more embodiments.

FIG. 4 is an illustration of an example implementation 400 of a system for application management, according to one or more embodiments. Here, in FIG. 4, a first application 212A is running in the 'foreground' because it occupies a larger display or screen area than a second application 214B, which is running in the 'background' because it is minimized (e.g., in a taskbar, etc.). A user may be able to multi-task or switch between applications by swiping in either direction along 410, for example.

Figure 5:
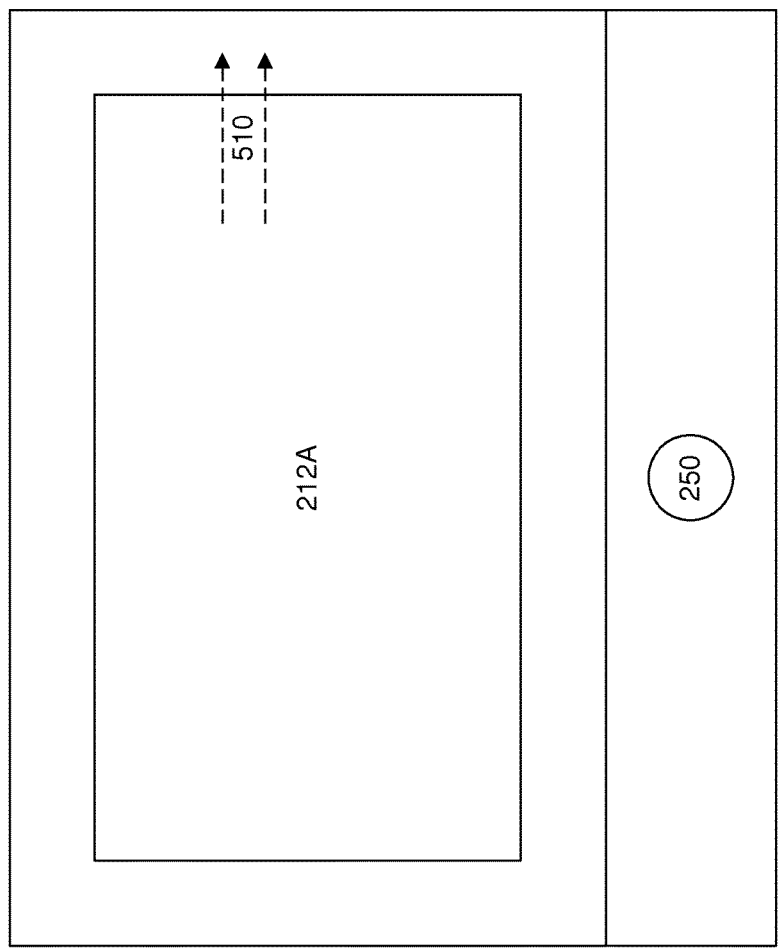
FIG. 5 is an illustration of an example implementation of a system for application management, according to one or more embodiments.

FIG. 5 is an illustration of an example implementation 500 of a system for application management, according to one or more embodiments. In FIG. 5, a first application 212A is running in the 'foreground' and a second application (214, not shown) is running in the 'background'. Here, a user may switch between the first application 212A and the second application 214 (not shown) by applying a two finger swipe indicated at 510, for example. In one or more embodiments, a magnitude associated with the swipe 510 or a length of a swipe may adjust a size of respective applications 212A or 214 (not shown).

Figure 6:
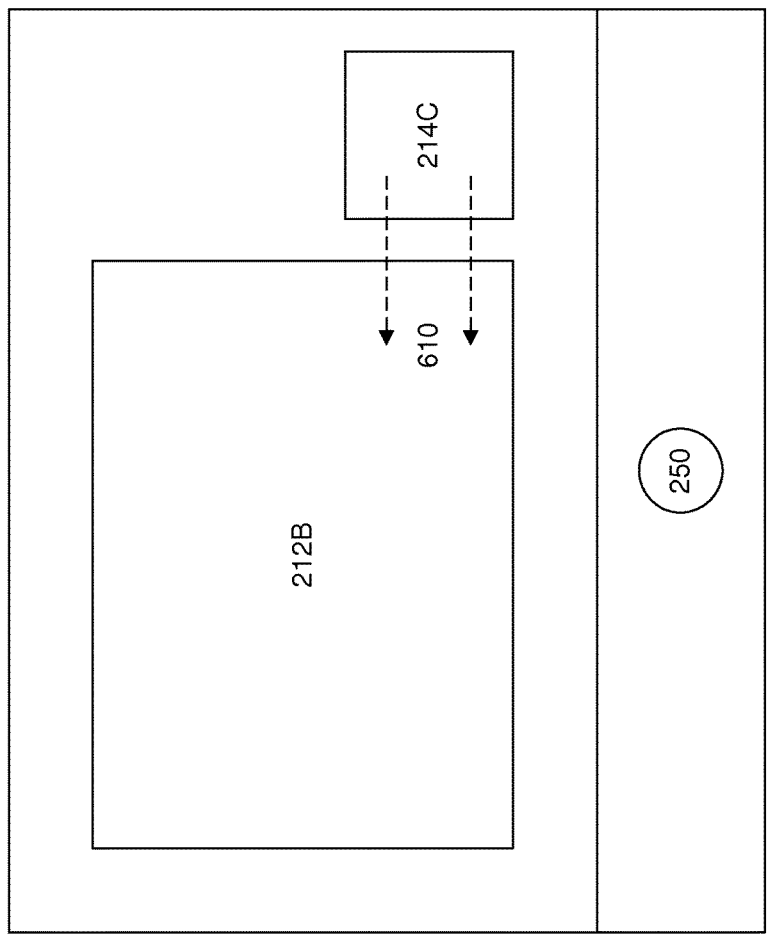
FIG. 6 is an illustration of an example implementation of a system for application management, according to one or more embodiments.

FIG. 6 is an illustration of an example implementation 600 of a system for application management, according to one or more embodiments. In FIG. 6, a first application 2128 is running in the 'foreground' and a second application 214C is running in the 'background', as indicated by the smaller screen area occupied by the second application 214C. Here, a user may switch between the first application 212A and the second application 214C by applying a two finger swipe indicated at 610, for example. In one or more embodiments, a magnitude associated with the swipe 610 or a length of a swipe may adjust a size of respective applications 2128 or 214C.

Figure 7:
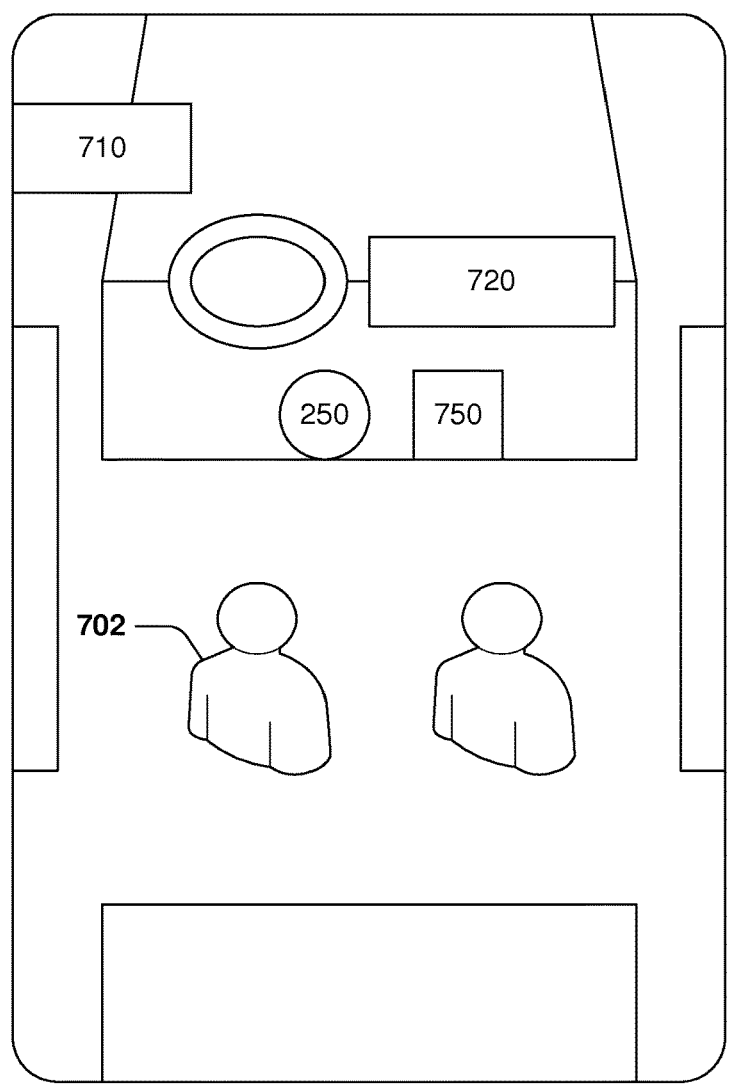
FIG. 7 is an illustration of an example implementation of a system for application management, according to one or more embodiments.

FIG. 7 is an illustration of an example implementation 700 of a system for application management, according to one or more embodiments. In this example, a vehicle may be equipped with a first display component 710 and a second display component 720. With reference to the system 100 of FIG. 1, the management component 140 or interface component 120 may generate, provide, or include a home button 250 and a swap button 750. Different techniques for managing, swapping, multi-tasking, or launching applications (e.g., on respective displays 710 and 720) may be provided utilizing these buttons 250 and 750. In other words different applications may be rendered on different displays (e.g., different outcomes) may be achieved depending on which user input is received by the interface component 120 (e.g., which may include the home button 250 and the swap button 750).

As an example, a navigation application may be running on or be rendered on the first display component 710 and an audio application may run or be rendered on the second display component 720. Here, in this example, if the user 702 presses the home button 250 once, the first display component 710 may render a home screen with one or more shortcuts, icons, or applications, such as a phone application. The user may launch the phone application by selecting that application. After the user 702 launches the phone application, the first display component 710 may render or display details or information associated with the phone application. Here, the second display component 720 may continue rendering or running the audio application (e.g., independent of user inputs received thus far). Continuing on, if the user 702 double taps the home button 250 (e.g., provides a user input to the interface component 120), the management component 140 may have the first display component 170 re-launch, render, or switch back to the navigation application because the navigation application was the most recently launched application prior to the phone application. In other words, here, a double tap of the home button 250 may return a user 702 to a previously launched application (e.g., which was last launched or running in the background).

When the swap button 750 is pressed, the management component 140 may have the first display component 710 render the audio application (e.g., which was previously rendered on the second display component 720) and have the second display component 720 render the navigation application (e.g., which was previously rendered on the first display component 710). In other words, the swap button 750 may execute functionality which swaps renderings between multiple displays. If additional displays are present, the swap button 750 may shift one or more applications between displays based on consecutive presses of the swap button 750. Here, a user may adjust settings to the audio application, which may be rendered on the first display component 710.

Double tapping the home button 250 may cause the management component 140 to have the first display component 710 render the navigation application, close the audio application or move the audio application to the background. Here, the double tapping of the home button 250 may not affect the second display component 720, which may continue to render information associated with navigation. Here, the management component 140 may divide information across multiple displays (e.g., the first display component 710 and the second display component 720) such that redundant information is not repeated across displays. For example, the first display component 710 may render a map while the second display component 720 may render turn by turn directions. Further, the management component 140 may search for additional information to render if display space is available due to the concurrent display of the navigation application on the first display component 710 and the second display component.

In this example, the double tap of the home button 250 is bound to the first display component 710. However, in other embodiments, the management component 140 may enable customized bindings of buttons, user inputs, etc. to a designated display. For example, the management component 140 may enable a user 702 to bind the double tap of the home button to affect rendering on the second display component 720 rather than the first display component 720. Similarly, if there is a third display component (not shown), the management component 140 may enable a user 702 to bind the swap button 750 to switch between applications merely on the second display component 720 and the third display component. However, in other embodiments, the swap button 750 may cycle through applications on all three display components.

Figure 8:
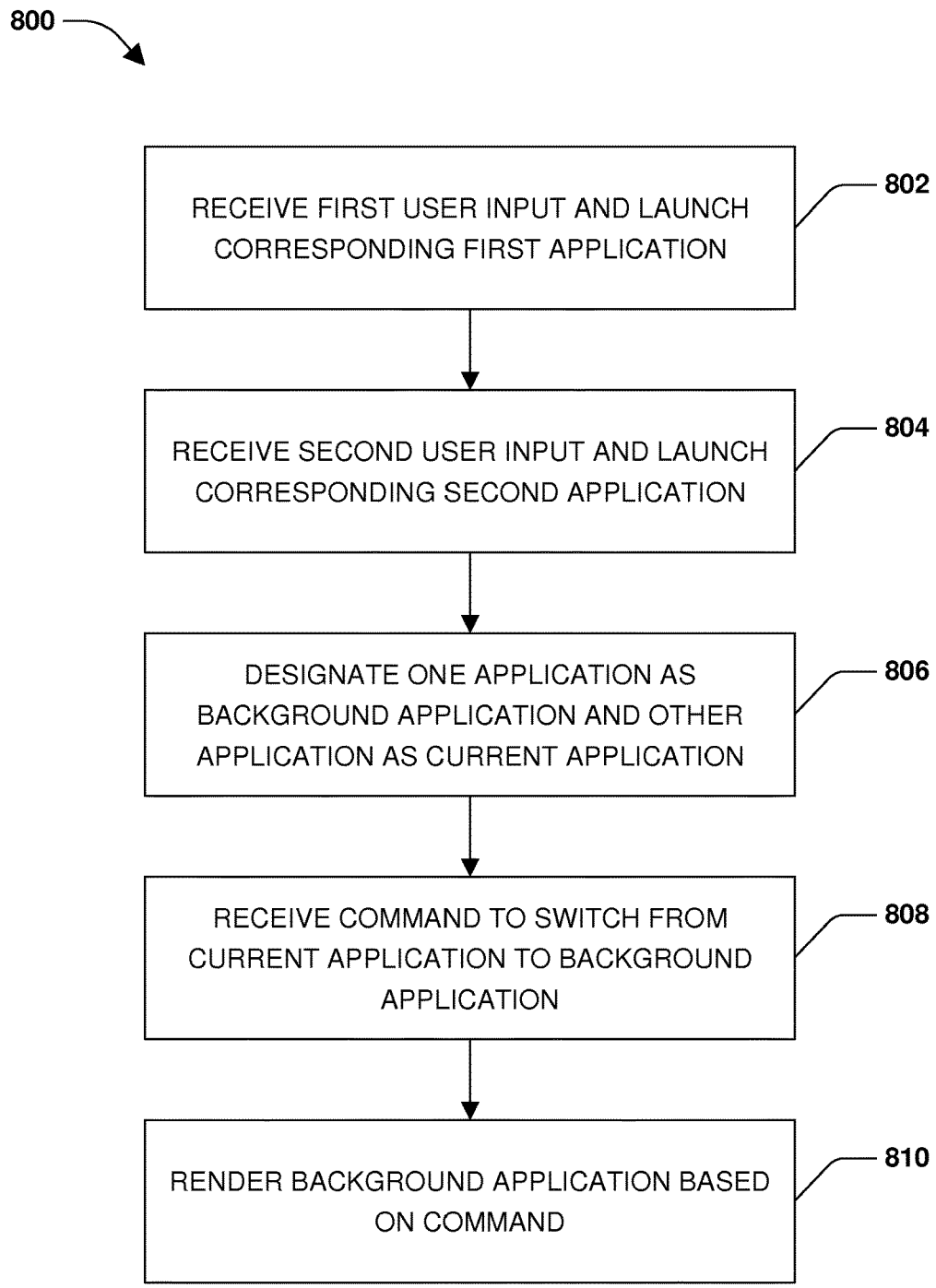
FIG. 8 is an illustration of an example flow diagram of a method for application management, according to one or more embodiments.

FIG. 8 is an illustration of an example flow diagram of a method 800 for application management, according to one or more embodiments. At 802, a first user input may be received to launch a first corresponding application. At 804, a second user input may be received to launch a second corresponding application. At 806, one of the applications may be designated as a foreground or current application while the other application may be designated as a background application. For example, the designation may be based on launch order of respective applications. At 808, a command to switch from the current application to the background application may be received, such as a double tap of a home button, for example. At 810, the background application may be rendered accordingly.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

Figure 9:
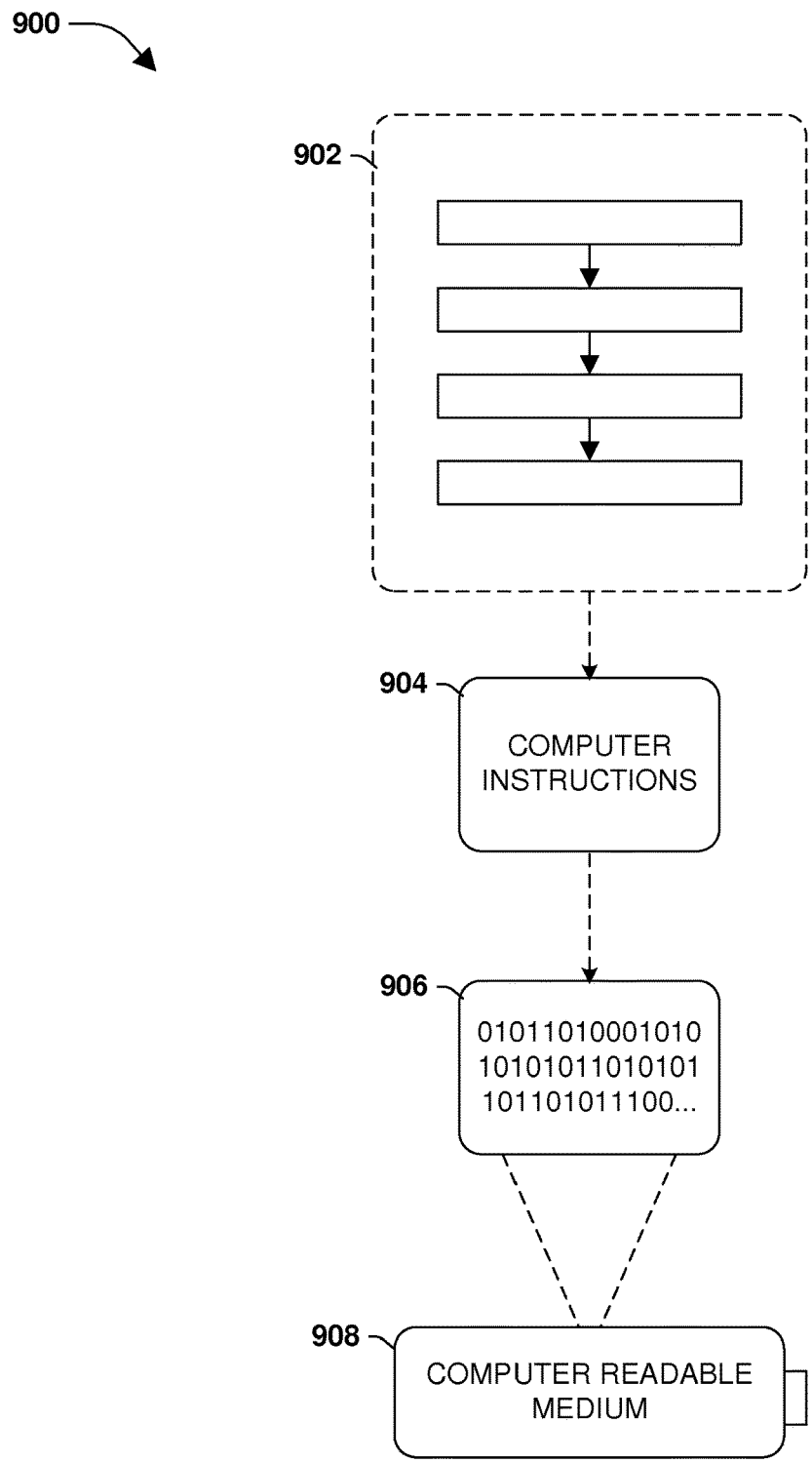
FIG. 9 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 9, wherein an implementation 900 includes a computer-readable medium 908, such as a CD-R, DVD-R, flash drive, a platter of a hard disk drive, etc., on which is encoded computer-readable data 906. This computer-readable data 906, such as binary data including a plurality of zero's and one's as shown in 906, in turn includes a set of computer instructions 904 configured to operate according to one or more of the principles set forth herein. In one such embodiment 900, the processor-executable computer instructions 904 may be configured to perform a method 902, such as the method 800 of FIG. 8. In another embodiment, the processor-executable instructions 904 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 10 and the following discussion provide a description of a suitable computing environment to implement embodiments of one or more of the provisions set forth herein. The operating environment of FIG. 10 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 10 illustrates a system 1000 including a computing device 1012 configured to implement one or more embodiments provided herein. In one configuration, computing device 1012 includes at least one processing unit 1016 and memory 1018. Depending on the exact configuration and type of computing device, memory 1018 may be volatile, such as RAM, non-volatile, such as ROM, flash memory, etc., or a combination of the two. This configuration is illustrated in FIG. 10 by dashed line 1014.

In other embodiments, device 1012 includes additional features or functionality. For example, device 1012 may include additional storage such as removable storage or non-removable storage, including, but not limited to, magnetic storage, optical storage, etc. Such additional storage is illustrated in FIG. 10 by storage 1020. In one or more embodiments, computer readable instructions to implement one or more embodiments provided herein are in storage 1020. Storage 1020 may store other computer readable instructions to implement an operating system, an application program, etc. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 1012. Any such computer storage media is part of device 1012.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1012 includes input device(s) 1024 such as keyboard, mouse, pen, voice input device, touch input device, infrared cameras, video input devices, or any other input device. Output device(s) 1022 such as one or more displays, speakers, printers, or any other output device may be included with device 1012. Input device(s) 1024 and output device(s) 1022 may be connected to device 1012 via a wired connection, wireless connection, or any combination thereof. In one or more embodiments, an input device or an output device from another computing device may be used as input device(s) 1024 or output device(s) 1022 for computing device 1012. Device 1012 may include communication connection(s) 1026 to facilitate communications with one or more other devices.

According to one or more aspects, a system for application management is provided, including an interface component, an application component, a management component, and a display component. The interface component may receive one or more user inputs. A first user input of one or more of the user inputs may be a command to launch a first application of one or more applications and a second user input of one or more of the user inputs may be a command to launch a second application of one or more of the applications. The application component may execute the first application in response to the first user input and execute the second application in response to the second user input. The management component may determine an updated view from a first view associated with the first application and a second view associated with the second application. Initiating determination of the updated view may be based on a third user input of one or more of the user inputs. The third user input may be a double tap of a home button. The display component may render the first application or the second application based on the updated view.

The system may include a storage component storing one or more applications. The system may include a customization component defining a customized user input based on one or more user selected actions. The management component may determine the updated view based on the customized user input. The interface component may generate a home button, such as a soft button, for example. The touchscreen may include the interface component and the display component. The double tap of the home button may be associated with a threshold tap time. The management component may determine a home screen view based on a fourth user input of one or more of the user inputs. The fourth user input may be a single tap of the home button.

The display component may render the home screen view and the application component may generate one or more shortcuts to one or more of the applications for the home screen view. The application component may track a launch order for one or more of the applications, an order of access for one or more of the applications, a previously launched application, a previously accessed application, or a frequency of access for one or more of the applications. The system may include a communication component receiving one or more usage characteristics associated with one or more of the applications. The display component renders a home screen view based on one or more of the usage characteristics.

According to one or more aspects, a method for application management is provided, including receiving a first user input indicative of a command to launch a first application, launching the first application in response to the first user input, receiving a second user input indicative of a command to launch a second application, launching the second application in response to the second user input, designating the first application as a background application based on the second user input, designating the second application as a current application based on the second user input, receiving a third user input indicative of a command to switch from the current application to the background application, and rendering the background application based on the third user input.

The method may include defining the third user input based on one or more user selected actions. The third user input may be a double tap of a home button, a selection of a task swap button, or a two finger swipe gesture. The method may include rendering a home screen which includes one or more shortcuts to a first application or one or more shortcuts to a second application.

According to one or more aspects, a system for application management is provided, including an interface component, an application component, a management component, and a display component. The interface component receives one or more user inputs, wherein a first user input of one or more of the user inputs is a command to launch a first application of one or more applications, wherein a second user input of one or more of the user inputs is a command to launch a second application of one or more of the applications. The application component executes the first application in response to the first user input and executing the second application in response to the second user input. The management component determines an updated view from a first view associated with the first application and a second view associated with the second application, wherein initiating determination of the updated view is based on a third user input of one or more of the user inputs, wherein the third user input is a double tap of a home button. The display component renders the updated view based on the third input.

The system may include a customization component defining a customized user input based on one or more user selected actions. The management component determines the updated view based on the customized user input. The interface component generates the home button in one or more embodiments. The double tap of the home button may be associated with a threshold tap time.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A vehicle system for application management, comprising:
   a processing unit;
   a vehicle interface component that is part of a vehicle and includes a home button, the interface component receiving one or more user inputs, wherein a first user input of one or more of the user inputs is a command to launch a first application of one or more applications, wherein a second user input of one or more of the user inputs is a command to launch a second application of one or more of the applications;
   an application component executing a vehicle operating system associated with the vehicle, executing on the vehicle operating system, the first application in response to the first user input, and executing, on the vehicle operating system, the second application in response to the second user input, wherein the first application and the second application are applications configured for operation on the vehicle operating system;
   a management component determining an updated view from a first view associated with the first application and a second view associated with the second application, wherein initiating determination of the updated view is based on a third user input of one or more of the user inputs, wherein the third user input is a double tap of the home button; and
   a display component rendering the first application or the second application based on the updated view,
   wherein the interface component, the application component, the management component, the display component, or one or more functions thereof are executed by the processing unit,
   wherein a fourth user input of one or more of the user inputs is a single tap of the home button, wherein in response to the fourth user input, the management component determines a home screen view associated with the vehicle operating system and the display component renders the home screen view based on an amount of time a user has spent interacting with one or more of the applications, a launch order for the first and second applications, timestamps indicative of when the first and second applications were last launched, and a velocity of the vehicle.

2. The system of claim 1, comprising a storage component storing one or more of the applications.

3. The system of claim 1, comprising a customization component defining a customized user input based on one or more user selected actions, wherein the management component determines the updated view based on the customized user input.

4. The system of claim 1, wherein the interface component generates the home button.

5. The system of claim 1, comprising a touchscreen comprising the interface component and the display component.

6. The system of claim 1, wherein the double tap of the home button is associated with a threshold tap time.

7. The system of claim 1, wherein in response to the fourth user input, the application component generates one or more shortcuts to one or more of the applications for the home screen view.

8. The system of claim 1, wherein the application component tracks a launch order for one or more of the applications, an order of access for one or more of the applications, a previously launched application, a previously accessed application, or a frequency of access for one or more of the applications.

9. The system of claim 1, comprising a communication component receiving one or more usage characteristics associated with one or more of the applications, wherein the display component renders the home screen view based on one or more of the usage characteristics.

10. A method for vehicle application management, comprising:
   receiving a first user input indicative of a command to launch a first application;
   launching the first application in response to the first user input;
   receiving a second user input indicative of a command to launch a second application;
   launching, on a vehicle operating system associated with a vehicle, the second application in response to the second user input;
   designating the first application as a background application based on the second user input;
   designating the second application as a current application based on the second user input, wherein the first application and the second application are applications configured for operation on the vehicle operating system;
   receiving a third user input indicative of a command to switch from the current application to the background application, wherein the third user input is a double tap of a home button of a vehicle interface component that is part of the vehicle;
   rendering the background application based on the third user input,
   receiving a fourth user input consisting of a single tap of the home button and indicative of a command to render a home screen view associated with the vehicle operating system, and
   rendering the home screen view based on the fourth user input and based on an amount of time a user has spent interacting with one or more applications, a launch order for the first and second applications, timestamps indicative of when the first and second applications were last launched, and a velocity of the vehicle, wherein the receiving, the launching, the designating, or the rendering is implemented via a processing unit.

11. The method of claim 10, comprising defining the third user input based on one or more user selected actions.

12. The method of claim 10, wherein the third user input is selection of a task swap button.

13. The method of claim 10, wherein the third user input is a two finger swipe gesture.

14. The method of claim 10, wherein the home screen view comprises one or more shortcuts to the first application or one or more shortcuts to the second application.

15. A computer-readable storage medium comprising instructions which, when executed by a processor, cause a computer to execute:

receiving one or more user inputs, wherein a first user input of one or more of the user inputs is a command to launch a first application of one or more applications, wherein a second user input of one or more of the user inputs is a command to launch a second application of one or more of the applications;

running a vehicle operating system associated with the vehicle, executing on the vehicle operating system, the first application in response to the first user input, and executing, on the vehicle operating system, the second application in response to the second user input, wherein the first application and the second application are applications configured for operation on the vehicle operating system;

determining an updated view from a first view associated with the first application and a second view associated with the second application, wherein initiating determination of the updated view is based on a third user input of one or more of the user inputs, wherein the third user input is a double tap of a home button; and rendering the updated view based on the third input, wherein a fourth user input of one or more of the user inputs is a single tap of the home button, wherein in response to the fourth user input, determining a home screen view associated with the vehicle operating system based on an amount of time a user has spent interacting with one or more of the applications, a launch order for the first and second applications, timestamps indicative of when the first and second applications were last launched, and a velocity of the vehicle and rendering the home screen view.

16. The computer-readable storage medium of claim 15, comprising instructions which, when executed by the processor, cause the computer to execute defining a customized user input based on one or more user selected actions, and determining the updated view based on the customized user input.

17. The computer-readable storage medium of claim 15, comprising instructions which, when executed by the processor, cause the computer to execute generating the home button.

18. The computer-readable storage medium of claim 15, wherein the double tap of the home button is associated with a threshold tap time.

* * * * *